Jan. 10, 1939.  E. W. SMITH  2,143,035
DISTANCE MEASURING APPARATUS
Filed Sept. 30, 1935
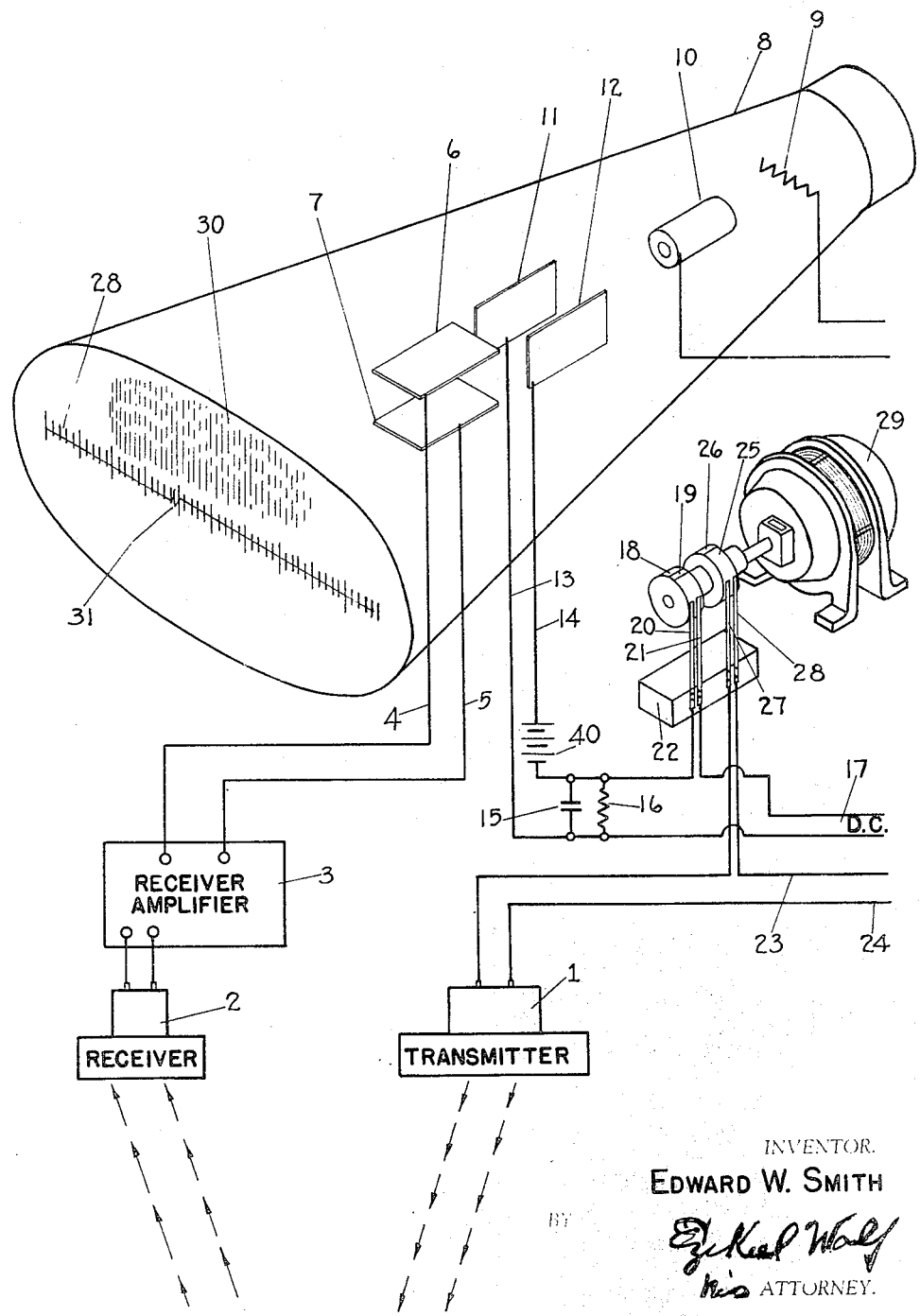
INVENTOR.
EDWARD W. SMITH
*his* ATTORNEY.

Patented Jan. 10, 1939

2,143,035

UNITED STATES PATENT OFFICE 2,143,035

DISTANCE MEASURING APPARATUS

Edward W. Smith, Melrose, Mass., assignor to Submarine Signal Company, Boston, Mass., a corporation of Maine Application September 30, 1935, Serial No. 42,872

4 Claims. (Cl. 177—386)

The present invention relates to a method and apparatus for the measurement of distance or time interval by the use of wave energy and more particularly by the use of radio or compressional wave energy.

In particular, the present invention relates to the measurement of time intervals with the use of an indicating device in which a visual indication may be produced and in this work the applicant has applied the use of a cathode ray tube in a manner that is particularly advantageous and novel in the present arrangement.

The cathode ray tube has proved in many instances to be particularly adaptable for producing indications of weak signals by interruption of the cathode beam or by movement of the cathode beam in or out of its normal course. In the use of the cathode ray tube for this purpose it is quite common to provide a special grid for cutting off or admitting the beam. As, however, this special electrode is usually applied between the filament and the so-called anode gun, considerable voltage is necessary to produce an effect upon the beam. As a matter of fact it is only possible either to turn on or turn off the beam and not to control to any great extent the size of the circle if the beam is rotated in a circle or to deflect the beam with any positive results. This is particularly a disadvantage under conditions where the energy that is picked up by the receiving unit is rather small and where accordingly a great deal of amplification is necessary to operate or control the cathode beam. The necessity of a high amplification should also be avoided in cases where the present invention finds a particular use, namely where the time intervals of measurement are very short and where the indication must be produced substantially simultaneously with the picking up of the signal.

In the present invention the indication of the signal picked up by the receiver is made to act upon the cathode ray tube in such a manner that a substantial deflection of the beam and an indication of the signal are produced without the necessity of extraordinary amplification.

In the present invention the type of tube preferably employed is somewhat flat and is provided with one pair of electrodes which may be operated to produce a uniform velocity of the beam across the scale, the other pair of electrodes being used to produce the indication from the pickup unit.

The invention will be more fully understood in connection with the description given below of the embodiment as illustrated in the figure.

In the drawing 1 indicates a transmitter and 2 a receiver. The transmitter may be of a high-frequency type capable of sending out a beam of sound, or it may be any other type of compressional wave or radio transmitter operable to produce an impulse of vibratory energy. The receiver may be a separate unit from the transmitter, or in the case of distance measurement by means of high frequency compressional waves, a unit for the transmitter and the receiver may be the same. The receiver is connected to an amplifying unit 3 which may be of the vacuum tube type or any other type capable of amplifying small values of electrical energy. The output of the receiver amplifier is impressed by means of the leads 4 and 5 on the plate electrodes 6 and 7 of the cathode ray tube. These electrodes may be the usual flat electrodes used to control the sweep of the cathode ray.

The cathode tube 8 is also provided with the usual cathode 9, the anode gun 10 and two inner sets of plates 11 and 12. The inner sets of plates 11 and 12 are connected through the leads 13 and 14 to the sweep circuit which includes the condenser 15 and the impedance or resistance 16. The condenser 15 of this sweep circuit is charged periodically by means of the supply source 17 when the commutator 18 connects the condenser across the supply. This occurs whenever the segment 19 of the commutator comes beneath the brushes 20 and 21 mounted on the block 22. The condenser is charged when the segment 19 comes beneath the brushes 20 and 21 and directly after this it begins to discharge across the resistance 16. The transmitter is so controlled by the supply leads 23 and 24 that the commutator 25 allows the power to be impressed upon it through the connection of the segment 26 between the brushes 27 and 28 for a short interval corresponding to the point where the beam starts to traverse the scale 28 of the cathode ray tube 8. The commutators 18 and 25 are operated continuously by the motor 29 at either a constant or a variable speed, as may be desired, their only function being to control the time of emission of the wave energy and the charging of the condenser 15. The velocity of the commutator may be made as slow as desired, but it should not be made any greater than the time interval necessary to allow the condenser to fully discharge across the resistance 16 before it is again charged by the segment 18 coming beneath the brushes 20 and 21.

The signal which is sent out will be a short impulse either of a group of continuous waves or one in which the energy is concentrated into one or more large vibrations. The energy transmitted is reflected from the object whose distance is to be measured or travels directly to the receiver whereupon it is translated into electrical energy or converted to be impressed upon the amplifying circuit 3, the output of which controls the potential on the plates 6 and 7 of the cathode ray tube.

In the operation of the device the beam is produced by making the gun 10 highly positive with respect to the filament 9 usually by a potential of the order of 2000 or 3000 volts. The beam is made to pass through the anode gun and between the plates 11 and 12 as well as the plates 6 and 7 and strikes the end of the tube where some phosphorous material 30 produces a spot or a mark of light.

The potential on the plates 11 and 12 will be made up of the algebraic sum of the potential of the condenser 15 and the battery 40, and as a result of this combined potential the beam will move across the scale from one side to the other as the condenser discharges.

It will be noted that the positions of the plates 11 and 12 are perpendicular to the line of the scale whereas the positions of the plates 6 and 7 are parallel to the line on the scale. Under such conditions a voltage between plates 6 and 7 will cause the beam to be drawn upward or downward, making a serration in the beam as indicated at 31. If the rate of discharge of the condenser 15 is known and controlled, then the scale 28 may be calibrated in units of distance for the velocity of propagation of the wave that is used, and under such conditions if the impulse is emitted at the zero of the scale, the distance from the zero of the scale to the point where serration occurs will measure the distance that the impulse has traveled. Conversely, if the distance is known, the time interval will be measured.

Having now described my invention, I claim:

1. A system for measuring distance which comprises, in combination, a cathode ray tube having cathode, anode and two pairs of plate electrodes, electrical means forming a sweep circuit for producing voltage variations for moving the electron beam produced in the tube across the tube, said sweep circuit being connected to one pair of plates, commutator means, receiving means and transmitting means, said commutator means having means for controlling the operation of said transmitting means and the sweep circuit, said receiving means being connected to the other pair of plates for moving the beam transverse to its normal path.

2. A system for measuring distance which comprises, in combination, means for producing an electron beam, means for causing the beam to move in a straight line across the scale, means for transmitting a signal, means simultaneously controlling the beginning of the movement of the beam and the transmission of the signal, means for receiving the signal and means associated with the receiving means for producing a motion of the beam transverse to the scale.

3. A system for measuring distance by the time-of-travel method comprising means for transmitting compressional wave impulses, means for receiving said impulses after reflection from the object whose distance is to be measured and means for measuring said distance comprising a cathode ray tube having a linear scale at the front thereof, means for sweeping the beam of the tube across the scale, means for transmitting the impulse, means for simultaneously controlling the beginning of the sweep of the beam and the transmission of the impulse, and means operable by the receiving means, upon the receipt of said reflected impulse, to cause a movement of said beam in a direction transverse to the direction of sweeping the beam.

4. In a system for measuring distance, a cathode ray indicator having a linear scale at the face thereof and cathode, anode and two pairs of control plates, means providing a linear sweep circuit between one pair of said plates, means for beginning the sweep of said beam across the scale at the beginning of the time interval to be measured, said first means including a biasing battery connected in series with said sweep circuit means for receiving the signal impulse and means connecting the other pair of said plates to a circuit receiving the signal impulse.

EDWARD W. SMITH.